US009327761B2

(12) United States Patent
Tsubaki

(10) Patent No.: US 9,327,761 B2
(45) Date of Patent: May 3, 2016

(54) ELECTRIC POWER STEERING APPARATUS

(71) Applicant: NSK LTD., Tokyo (JP)

(72) Inventor: Takahiro Tsubaki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/419,796

(22) PCT Filed: Jan. 29, 2014

(86) PCT No.: PCT/JP2014/051931
§ 371 (c)(1),
(2) Date: Feb. 5, 2015

(87) PCT Pub. No.: WO2015/114751
PCT Pub. Date: Aug. 6, 2015

(65) Prior Publication Data
US 2016/0001810 A1    Jan. 7, 2016

(51) Int. Cl.
*G06F 19/00*    (2011.01)
*B62D 5/04*    (2006.01)
*B62D 6/00*    (2006.01)
*B62D 6/02*    (2006.01)
(Continued)

(52) U.S. Cl.
CPC ........... *B62D 5/0463* (2013.01); *B62D 1/28* (2013.01); *B62D 6/002* (2013.01); *B62D 6/02* (2013.01); *B62D 6/08* (2013.01)

(58) Field of Classification Search
CPC ........ B62D 5/0463; B62D 6/002; B62D 6/02; B62D 6/08; B62D 1/28; B60T 2201/08; B60T 2201/087; G05D 2201/0213

USPC ................. 701/28, 41, 42; 180/443; 348/119
See application file for complete search history.

(56) References Cited

U.S. PATENT DOCUMENTS

| 6,170,600 B1* | 1/2001 | Shimizu | B62D 1/28 180/446 |
| 2002/0013647 A1* | 1/2002 | Kawazoe | B62D 1/28 701/41 |

(Continued)

FOREIGN PATENT DOCUMENTS

| JP | 08-290778 A | 11/1996 |
| JP | 2002-145075 A | 5/2002 |

(Continued)

OTHER PUBLICATIONS

International Search Report of PCT/JP2014/051931 dated Apr. 22, 2014 [PCT/ISA/210].

*Primary Examiner* — McDieunel Marc
(74) *Attorney, Agent, or Firm* — Sughrue Mion, PLLC

(57) ABSTRACT

An electric power steering apparatus including: a steering angle control section that calculates a motor current command value and a switching section that inputs the motor current command value to switch. The steering angle control section has a feedback control section that generates a feedback control current command value; an SAT compensating section that generates an SAT compensation current command value; and an output section that generates the motor current command value from the feedback control current command value and the SAT compensation current command value. The switching section is switched depending on a switching command of an automatic steering mode and a manual steering mode, a motor is drive-controlled based on the motor current command value in the automatic steering mode.

9 Claims, 14 Drawing Sheets

(51) Int. Cl.
*B62D 6/08* (2006.01)
*B62D 1/28* (2006.01)

(56) References Cited

U.S. PATENT DOCUMENTS

| | | | | |
|---|---|---|---|---|
| 2003/0102181 | A1* | 6/2003 | Tokumoto | B62D 5/0457 180/446 |
| 2006/0089770 | A1* | 4/2006 | Ito | B62D 1/286 701/41 |
| 2006/0090952 | A1* | 5/2006 | Ito | B62D 15/0235 180/446 |
| 2008/0059026 | A1* | 3/2008 | Akiyama | B62D 5/008 701/41 |
| 2013/0190988 | A1* | 7/2013 | Limpibunterng | B62D 5/008 701/42 |
| 2015/0151786 | A1* | 6/2015 | Fujii | B62D 6/008 701/42 |
| 2015/0191199 | A1* | 7/2015 | Tsubaki | B62D 1/286 701/42 |
| 2015/0191200 | A1* | 7/2015 | Tsubaki | B62D 15/0285 701/42 |
| 2015/0291214 | A1* | 10/2015 | Mitsumoto | B62D 6/002 701/41 |
| 2015/0298695 | A1* | 10/2015 | Kodaira | B60W 30/12 701/48 |

FOREIGN PATENT DOCUMENTS

| | | |
|---|---|---|
| JP | 2002-161969 A | 6/2002 |
| JP | 2002-369565 A | 12/2002 |
| JP | 2007-269140 A | 10/2007 |
| JP | 2013-193490 A | 9/2013 |
| JP | 2013-252729 A | 12/2013 |
| WO | 2008/146372 A1 | 12/2008 |

* cited by examiner

PRIOR ART

PRIOR ART

PRIOR ART (A) (STEERING ANGLE RESPONSE WAVEFORM)

(B) (SAT ESTIMATE VALUE WAVEFORM)

(C)

ELECTRIC POWER STEERING APPARATUS

CROSS REFERENCE TO RELATED APPLICATIONS

This application is a National Stage of International Application No. PCT/JP2014/051931, filed Jan. 29, 2014, the contents of which are incorporated herein by reference in its entirety.

TECHNICAL FIELD

The present invention relates to an electric power steering apparatus that has functions of an automatic steering mode (parking support mode) and a manual steering mode and provides a steering system of a vehicle with an assist force generated by a motor, and in particular to an electric power steering apparatus capable of further improving a follow-up capability of an actual steering angle to a target steering angle in the automatic steering mode.

BACKGROUND ART

An electric power steering apparatus which provides a steering mechanism of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus will be described with reference to FIG. 1. As shown in FIG. 1, a column shaft (a steering shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a steering assist command value of an assist (steering assist) command based on a steering torque Th detected by the torque sensor 10 and a vehicle velocity Vel detected by a vehicle velocity sensor 12, and controls a current supplied to the motor 20 based on a current control value E obtained by performing compensation and so on with respect to the steering assist command value. Moreover, it is also possible to receive the vehicle velocity Vel from a CAN (Controller Area Network) or the like.

In such an electric power steering apparatus, conventionally, for example, as disclosed in Japanese Published Unexamined Patent Application No. H8-290778A (Patent Document 1), a system stability and sensitivity characteristics of road surface information and disturbance information are simultaneously designed by a robust stabilization compensating section within the control unit 100.

However, in such a conventional control device, since a reaction force in a case of steering performed in the vicinity of a steering neutral position is small, due to the influence of friction, it is difficult to accurately transmit the road surface information to a driver. Further, it is difficult for the conventional electric power steering apparatus to let a hysteresis characteristic between a steering angle and the steering force be a characteristic the same as that of a hydraulic power steering.

As an apparatus for solving such a problem, there is an apparatus disclosed in Japanese Published Unexamined Patent Application No. 2002-369565 A (Patent Document 2).

A gross outline of the apparatus disclosed in Patent Document 2 will be described with reference to FIG. 2 corresponding to FIG. 1. As shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Th from the torque sensor 10 and the vehicle velocity Vel from a vehicle velocity detecting system are inputted into the control unit 100. In the motor 20, a motor inter-terminal voltage Vm and a motor current value i are measured and outputted.

The control unit 100 comprises a torque system control unit 110 indicated by a dashed line that performs a control by using the steering torque Th and a motor system control unit 120 indicated by a dashed-dotted line that performs a control relating to driving of the motor 20. The torque system control unit 110 comprises an assist amount calculating section 111, a differential control section 112, a yaw rate convergence control section 113, a robust stabilization compensating section 114 and an SAT (Self Aligning Torque) estimation feedback section 115, addition sections 116A and 116B, and a subtraction section 116C. Further, the motor system control unit 120 comprises a compensating section 121, a disturbance estimating section 122, a motor angular velocity calculating section 123, a motor angular acceleration calculating section 124, a motor characteristic compensating section 125, and addition sections 126A and 126B.

The steering torque Th is inputted into the assist amount calculating section 111, the differential control section 112, the yaw rate convergence control section 113 and the SAT estimation feedback section 115, and all of them input the vehicle velocity Vel as a parameter. The assist amount calculating section 111 calculates an assist torque amount based on the steering torque Th. The yaw rate convergence control section 113 inputs the steering torque Th and a motor angular velocity ω, and brakes a movement that the steering wheel whirls to improve the convergence of yaw of the vehicle. Further, the differential control section 112 enhances a control responsibility in the vicinity of the neutral position of the steering and realizes a smooth steering. Moreover, the SAT estimation feedback section 115 inputs the steering torque Th, a signal obtained in the addition section 116A by adding the output of the differential control section 112 to the output of the assist amount calculating section 111, the motor angular velocity ω calculated by the motor angular velocity calculating section 123 and a motor angular acceleration α from the motor angular acceleration calculating section 124 to estimate an SAT, performs signal processing by using a feedback filter with respect to the estimated SAT, and provides the steering wheel with a suitable road information as a reaction force.

Further, a signal that is obtained in the addition section 116B by adding the output of the yaw rate convergence control section 113 to a signal obtained in the addition section 116A by adding the output of the differential control section 112 to the output of the assist amount calculating section 111, is inputted into the robust stabilization compensating section 114 as an assist amount AQ. For example, the robust stabilization compensating section 114 is a compensating section disclosed in Japanese Published Unexamined Patent Application No. H8-290778 A, removes a peak value in a resonance frequency of a resonance system comprised of an inertia element and a spring element that are included in the detected torque, and compensates a phase shift of the resonance frequency that disturbs the responsibility and the stability of the control system. By subtracting the output of the SAT estimation feedback section 115 from the output of the robust stabilization compensating section 114 in the subtraction section 116C, an assist amount Ia capable of transmitting the road information to the steering wheel as the reaction force, is obtained.

Moreover, the motor angular velocity calculating section 123 calculates the motor angular velocity $\omega$ based on the motor inter-terminal voltage Vm and the motor current value i, and the motor angular velocity $\omega$ is inputted into the motor angular acceleration calculating section 124, the yaw rate convergence control section 113 and the SAT estimation feedback section 115. The motor angular acceleration calculating section 124 calculates the motor angular acceleration $\alpha$ based on the inputted motor angular velocity $\omega$, and the calculated motor angular acceleration $\alpha$ is inputted into the motor characteristic compensating section 125. In the addition sections 126A, the assist amount Ia obtained by subtracting the output of the SAT estimation feedback section 115 from the output of the robust stabilization compensating section 114, is added to the output Ic of the motor characteristic compensating section 125, and then this added signal is inputted into the compensating section 121 comprised of a differential compensating section or the like as a current command value Ir. A signal that is obtained by adding the output of the disturbance estimating section 122 in the addition section 126B to a current command value Ira obtained by compensating the current command value Ir by means of the compensating section 121, is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system based on a signal obtained by adding the output of the disturbance estimating section 122 to the current command value Ira compensated by the compensating section 121 that is the control target of the motor output and the motor current value i, and does not lose the stability of the control system.

Here, the aspects of torques generated between a road surface and a steering will be described with reference to FIG. 3. When the driver steers the steering wheel 1, the steering torque Th is generated and then the motor 20 generates an assist torque Tm in accordance with the steering torque Th. As a result, wheels are steered and the SAT is generated as the reaction force. Further, in such case, due to an inertia J and a friction (a static friction) Fr of the motor 20, a torque becoming the resistance of steering the steering wheel, is generated. By considering a balance between these forces, and by setting a sign( ) as a sign function, a motion equation such as the following Expression 1 is obtained.

$$J \cdot \dot{\omega} + Fr \cdot \text{sign}(\omega) + SAT = Tm + Th \quad \text{[Expression 1]}$$

Here, by setting initial values to zero, performing a Laplace transform for the above Expression 1 and then solving with respect to the SAT, the following Expression 2 is obtained.

$$SAT(s) = Tm(s) + Th(s) - J \cdot \alpha(s) - Fr \cdot \text{sign}(\omega(s)) \quad \text{[Expression 2]}$$

It is clear from the above Expression 2 that by preliminarily obtaining the inertia J and the static friction Fr of the motor 20 as constants, it is possible to estimate the SAT based on the motor angular velocity $\omega$, the motor angular acceleration $\alpha$, the steering assist torque Tm and the steering torque Th. For such a reason, the steering torque Th, the motor angular velocity $\omega$, the motor angular acceleration $\alpha$ and the output of the assist amount calculating section 111 are inputted into the SAT estimation feedback section 115.

Further, in the case of directly feeding back an SAT estimation current value *SAT estimated by the SAT estimation feedback section 115 without any processing, since the steering becomes too heavy, it is impossible to improve the steering feeling. Therefore, as shown in FIG. 4, a signal processing is performed with respect to the SAT estimation current value *SAT by using a feedback filter 115A having a vehicle velocity sensitive gain and a frequency characteristic, and only necessary and sufficient information for improving the steering feeling is fed back. The feedback filter 115A used in here comprises a Q-filter (phase-lag) 115B having a gain as a static characteristic gain that reduces the amplitude of the estimated SAT to a necessary and sufficient value and a gain section 115C having a gain characteristic shown in FIG. 5 that is sensitive to the vehicle velocity Vel, and decreases the road surface information to feed back in the case that the importance of the road surface information such as a static steering or a low speed driving is relatively low.

Although the apparatus described in the above Patent Document 2 configures the feedback of SAT estimation so that a frequency band in which there are disturbances that need to be suppressed and a frequency band in which there are disturbances that need to be transmitted are compatible, there is no function that actively cancels out the disturbances that need to be suppressed.

On the other hand, in the vehicle, at ordinary braking and steady-state running, a brake judder and a shimmy that give annoyance to passengers occur. The brake judder is a floor and pedal vibration occurring at braking of the vehicle, and sometimes induces a vibration in steering rotation direction. A variation in braking torque caused by DTV (Disk Thickness Variation) of the brake disk is the excitation source of the brake judder and has the first-order and higher-order components of the wheel rotation. It is amplified by the fore-and-aft resonance of the suspension and transmitted through the vehicle body and the steering system, and ultimately becomes the floor and pedal vibration and the steering vibration. Further, the shimmy is a vibration that occurs in the steering rotation direction during running of the vehicle. An imbalance and non-uniformity of rotating parts such as tires and wheels become the excitation source of the shimmy. It is amplified by the suspension resonance and then becomes the vibration in steering rotation direction through the steering system.

The apparatus of Patent Document 2 does not consider the brake judder and the shimmy described above at all. Further, in Japanese Published Unexamined Patent Application No. 2002-145075 A (Patent Document 3) and Japanese Published Unexamined Patent Application No. 2002-161969 A (Patent Document 4), although apparatuses that damp vibrations due to the brake judder and the shimmy are disclosed, both of which are mechanical handling, and there is a problem that the cost increases and simultaneously a finely-tuned suppression such as the vehicle velocity sensitive is impossible.

Furthermore, in the case that the inertia and the friction of the steering system are large, although the vibrations due to the brake judder do not spread to the steering wheel, for the sake of a good steering feeling and a vehicle stability, it is preferred that the inertia and the friction of the steering system are minimal.

In such an electric power steering apparatus, recently, vehicles equipped with a parking support function (parking assist) that switches an automatic steering mode and a manual steering mode appear. In a vehicle equipped with the parking support function, a target steering angle is set based on data from a camera (image), a distance sensor or the like, and an automatic control in accordance with the target steering angle, is performed.

In PCT Publication No. WO2008/146372 (Patent Document 5), the steered wheel is steered depending on driver's steering wheel operation by comprising a target driving amount calculating section that generates a target auxiliary steering angle or a target steered angle added by an auxiliary steering angle superposition mechanism based on a steering-wheel steering angle detection value from a steering wheel angle detecting section and a transmission characteristic, and calculates a target driving amount of a motor so as to make the target auxiliary steering angle and an auxiliary steering angle detection value from an auxiliary steering angle detecting section coincide with each other or so as to make the target steered angle and a steered angle detection value from a steered angle detecting section coincide with each other, and a motor driving section that drives the motor in accordance with the target driving amount.

THE LIST OF PRIOR ART DOCUMENTS

Patent Documents

Patent Document 1: Japanese Published Unexamined Patent Application No. H8-290778 A
Patent Document 2: Japanese Published Unexamined Patent Application No. 2002-369565 A
Patent Document 3: Japanese Published Unexamined Patent Application No. 2002-145075A
Patent Document 4: Japanese Published Unexamined Patent Application No. 2002-161969 A
Patent Document 5: PCT Publication No. WO2008/146372

SUMMARY OF THE INVENTION

Problems to be Solved by the Invention

However, in the electric power steering apparatus disclosed in Patent Document 5, since a rate limit processing is not performed with respect to the target steering angle, when the target steering angle changes rapidly, the steering feeling of the driver is impaired. Further, since a gain control in accordance with the vehicle velocity is not performed, there is a problem that it is impossible to perform a precise control corresponding to the vehicle velocity.

Further, although the steering angle control of the steering wheel is performed in the automatic steering mode such as a parking support, an automatic running or the like, since the friction (SAT) that tires receive from the road surface varies due to the influences of the vehicle velocity, the road surface condition (inclination, moisture, etc.) and so on, there is a problem that the follow-up capability of the actual steering angle with respect to the target steering angle of the column shaft angle varies, and solution for such a problem is also required.

The present invention has been developed in view of the above-described circumstances, and an object of the present invention is to provide an electric power steering apparatus that is capable of obtaining a safe and comfortable steering performance by performing a signal processing in a high frequency domain with respect to the road surface information and so on to realize an easy tuning and achieve suppression of the brake judder and the shimmy and accurately steering in accordance with the calculated target steering angle in the automatic steering mode (the parking support function), simultaneously, is capable of smoothly steering even if the target steering angle is a rapid steering and constantly following up the target steering angle by raising the responsibility or a steady-state deviation even in a low vehicle velocity.

Means for Solving the Problems

The present invention relates to an electric power steering apparatus that calculates a first motor current command value based on a steering torque and a vehicle velocity, performs an assist control of a steering system by driving a motor based on said first motor current command value, and has a function for switching between an automatic steering mode and a manual steering mode, the above-described object of the present invention is achieved by that comprising: a steering angle control section that calculates a second motor current command value based on a target steering angle, an actual steering angle, a motor angular velocity and a motor angular acceleration of said motor, said steering torque and a previous time current command value; and a switching section that inputs said first motor current command value and said second motor current command value to switch, wherein said steering angle control section comprises a feedback control section that generates a feedback control current command value based on said target steering angle, said actual steering angle, said motor angular velocity and said steering angle; an SAT compensating section that generates an SAT compensation current command value based on said motor angular velocity, said motor angular acceleration, said steering torque and said previous time current command value; and an output section that generates said second motor current command value from said feedback control current command value and said SAT compensation current command value, wherein said switching section is switched depending on a switching command of said automatic steering mode and said manual steering mode, said motor is drive-controlled based on said second motor current command value in said automatic steering mode.

Further, the above-described object of the present invention is more effectively achieved by that wherein said feedback control section comprises a rate limiter that performs a smoothing with respect to said target steering angle; a low pass filter (LPF) that is connected to an output of said rate limiter; a first proportional gain section that multiplies an angle deviation between an output of said LPF and said actual steering angle by a proportional gain; an integral gain section that integrates a velocity deviation between an error velocity from said first proportional gain section and said motor angular velocity and multiplies said integrated velocity deviation by an integral gain; a second proportional gain section that multiplies said velocity deviation by a proportional gain; a differential gain section that differentiates said steering torque and multiplies said differentiated steering torque by a differential gain; and an output section that performs an addition that adds an output of said differential gain section to a deviation value between an output of said integral gain section and an output of said second proportional gain section, limits a result of said addition by an upper and a lower limit values and outputs said feedback control current command value; or wherein said SAT compensating section comprises an SAT estimating section that calculates an SAT estimation current value based on said steering torque, said motor angular velocity, said motor angular acceleration and said previous time current command value; a low pass filter (LPF) that inputs said SAT estimation current value and simultaneously has a characteristic that a cut-off frequency is higher than an angle response frequency; and a vehicle velocity sensitive gain section that multiplies an output of said LPF by a vehicle velocity variable gain and outputs said SAT compensation current command value; or wherein said SAT estimating section comprises a viscous friction coefficient section that multiplies said motor angular velocity by a viscous friction coefficient; a signization Coulomb friction section that signizes said motor angular velocity and multiplies said signized motor angular velocity by a Coulomb friction; an overall inertial moment section that multiplies said motor angular acceleration by an overall inertial moment; and an output coefficient section that performs a subtraction that subtracts said steering torque from an addition value of an output of said viscous friction coefficient section and an output of said signization Coulomb friction section, performs an addition that adds an output of said overall inertial moment section to a result of said subtraction, and multiplies a result of said addition by a coefficient; or wherein said SAT estimating section comprises an addition section that adds a current command value corresponding to an assist torque and said steering torque; a first subtraction section that subtracts a value obtained by multiplying said motor angular acceleration by an inertial from an addition result of said addition section; and a second subtraction section that subtracts a value obtained by signizing said motor angular velocity and multiplying said signized motor angular velocity by a friction from a subtraction result of said first subtraction section, and outputs said SAT estimation current value; or wherein a limiter that limits an upper and a lower limit values is connected to a post-stage of said vehicle velocity sensitive gain section.

Effects of the Invention

According to an electric power steering apparatus of the present invention, in a vehicle having the automatic steering mode (parking support function) and the manual steering mode, since the target steering angle to calculate based on data from a camera (image), a distance sensor or the like is calculated with considering the vehicle velocity, it is possible to accurately steer with respect to the target steering angle, and simultaneously, the driver does not feel an uncomfortable feeling. Further, with respect to a radical target steering angle, since the smoothing of the rapid target steering angle is performed to control, the driver does not feel an anxious feeling even in automatic operation.

In addition, since the electric power steering apparatus of the present invention raises the responsibility or the steady-state deviation by raising the control gain in the case of a low vehicle velocity, it is possible to bring the actual steering angle close to the target steering angle even in a low vehicle velocity.

Moreover, since the electric power steering apparatus of the present invention estimates an SAT, performs filtering of the estimated SAT by means of an LPF (Low Pass Filter) that a cut-off frequency higher than an angle response frequency is set, multiplies a value after filtering by a vehicle velocity gain set in accordance with the vehicle velocity and adds the multiplication result as a compensation value, it is possible to more improve the follow-up capability of the actual steering angle to the target steering angle.

BRIEF DESCRIPTION OF THE DRAWINGS

In the accompanying drawings.

MODE FOR CARRYING OUT THE INVENTION

Although the steering angle control of the steering wheel is performed in the automatic steering mode such as a parking support, an automatic running or the like, since the friction (SAT (Self Aligning Torque)) that tires receive from the road surface varies due to the influences of the vehicle velocity, the road surface condition (inclination, moisture, etc.) and so on, there is a problem that the follow-up capability of the actual steering angle with respect to the target steering angle of the column shaft angle varies. In order to solve this problem, the present invention estimates an SAT, performs filtering of the estimated SAT by means of an LPF (Low Pass Filter) that a cut-off frequency higher than an angle response frequency is set, multiplies an SAT value after filtering by a vehicle velocity gain set in accordance with the vehicle velocity and adds the multiplication result as a compensation value to a current command value so as to improve the follow-up capability of the actual steering angle to the target steering angle.

The present invention generates a motor torque in a direction cancelling out the influence of the reaction force (SAT) that tires receive from the road surface by adding an SAT compensation current command value generated in an SAT compensating section to a feedback control current command value generated in a feedback control section. In this way, it is possible to suppress the influence of SAT-disturbances occurring during the steering angle control and improve the follow-up capability of the steering angle control with respect to the target steering angle. For example, as an example of the parking support operation, since the SAT varies depending on a friction p between the tires and the road surface, and the steering angle response also varies in accordance with this, there is a problem that the handling of the vehicle side becomes difficult. For another example, in the case that an inclination of the road surface occurs in the right and left directions of the vehicle body during the automatic running, since the SAT is applied to one direction, there is a problem that due to this influence, shift of the steering angle with respect to the target steering angle occurs temporarily. As a means of solving these problems, by subtracting the SAT compensation current command value from the feedback control current command value, the present invention enables the steering angle control with a better follow-up capability.

Figure 6:
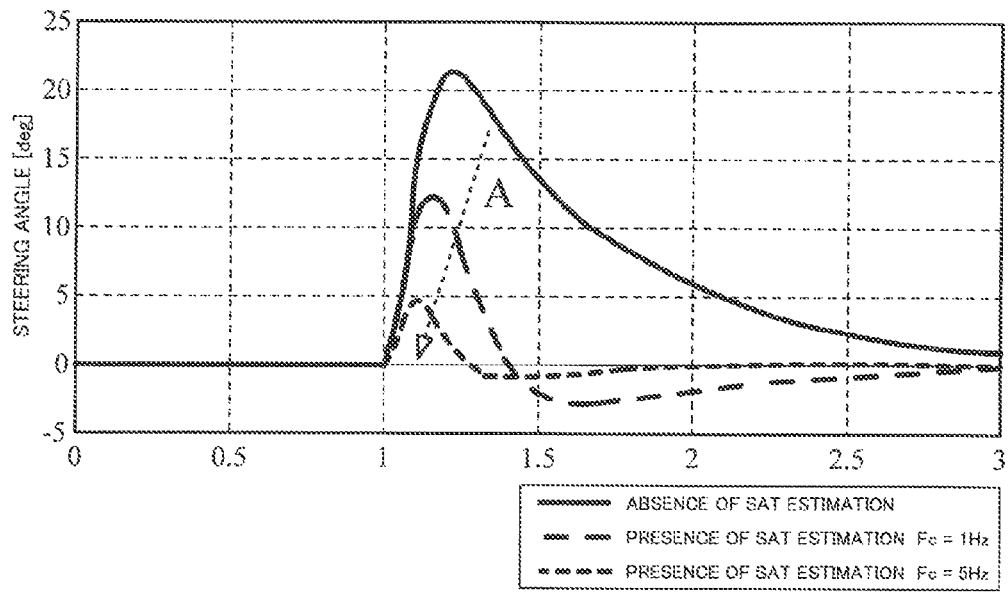
FIGS. 6(A), (B) and (C) are characteristic diagrams for explaining the principle of the present invention.
Figure 6:
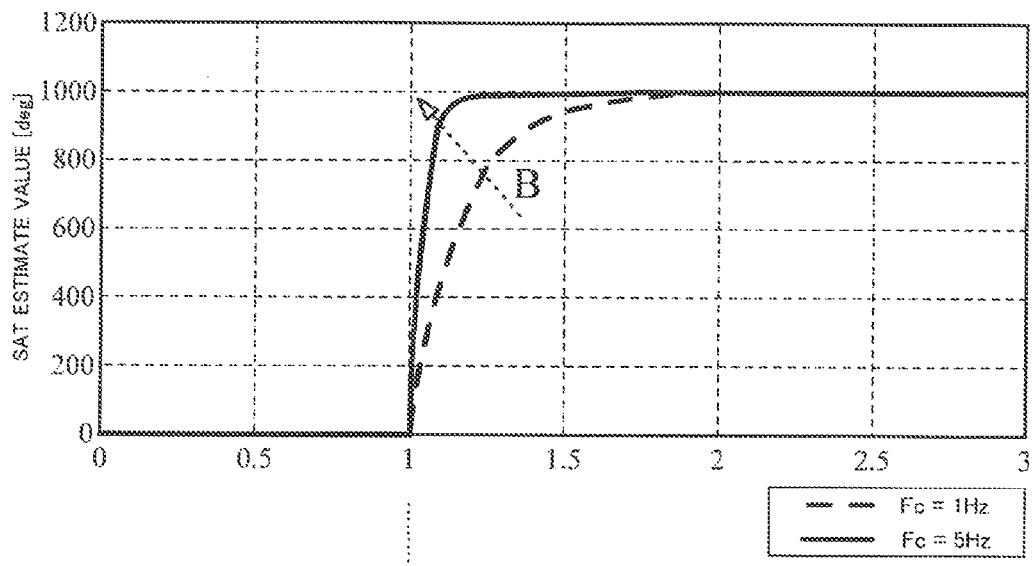
Figure 6:
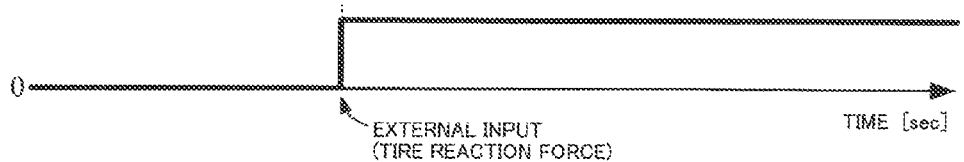

FIG. 6(A) shows one example of a steering angle response waveform, and FIG. 6(B) shows one example of an SAT estimation value waveform. FIGS. 6(A) and 6(B) show each response waveform in the case that an SAT-disturbance step shown in FIG. 6(C) is inputted after 1 second from a time (second) 0. In the present invention, an LPF (Low Pass Filter) that cuts high-frequency components of the disturbance is used in a compensation path of the SAT estimation value that has a function of extracting the disturbance components to cancel out, and the steering angle response waveform and the SAT estimation value waveform vary depending on the magnitude of LPF's cut-off frequency Fc. When the SAT-disturbance step shown in FIG. 6(C) is inputted, with respect to the SAT estimation value waveform shown in FIG. 6(B), as indicated by an arrow B, its rising becomes large as the LPF's cut-off frequency Fc becomes large, and it is possible to cancel out the disturbance at a high speed. In this way, as shown in FIG. 6(A), the steering angle varies from "absence of SAT estimation" like an arrow A, it is possible to improve the steering angle responsibility as the LPF's cut-off frequency Fc is increased. Consequently, it is possible to suppress the sudden rotation of the steering wheel.

Further, the road surface reaction force (SAT) transmitted to the steering system through the tires, is different depending on the vehicle velocity even in the case of the vehicle having the automatic steering mode and the manual steering mode. Therefore, in the automatic steering mode, when the automatic control of the steering is performed based on the calculated target steering angle, the steering angle response is different depending on the vehicle velocity. Thus, the present invention adjusts a motor current command value for the automatic control depending on the vehicle velocity to reduce the influence of the road surface reaction force that tires receive from the road surface. Furthermore, since the present invention performs a smoothing processing by a rate limiter with respect to the target steering angle, an effect that moderates the response of the steering angle of the steering wheel even when the target steering angle has an abrupt change can be achieved. It is possible to accurately move the vehicle with respect to the target steering angle regardless of the vehicle velocity, and it is safer for the driver.

Hereinafter, embodiments of the present invention will be described in detail with reference to the accompanying drawings.

Figure 7:
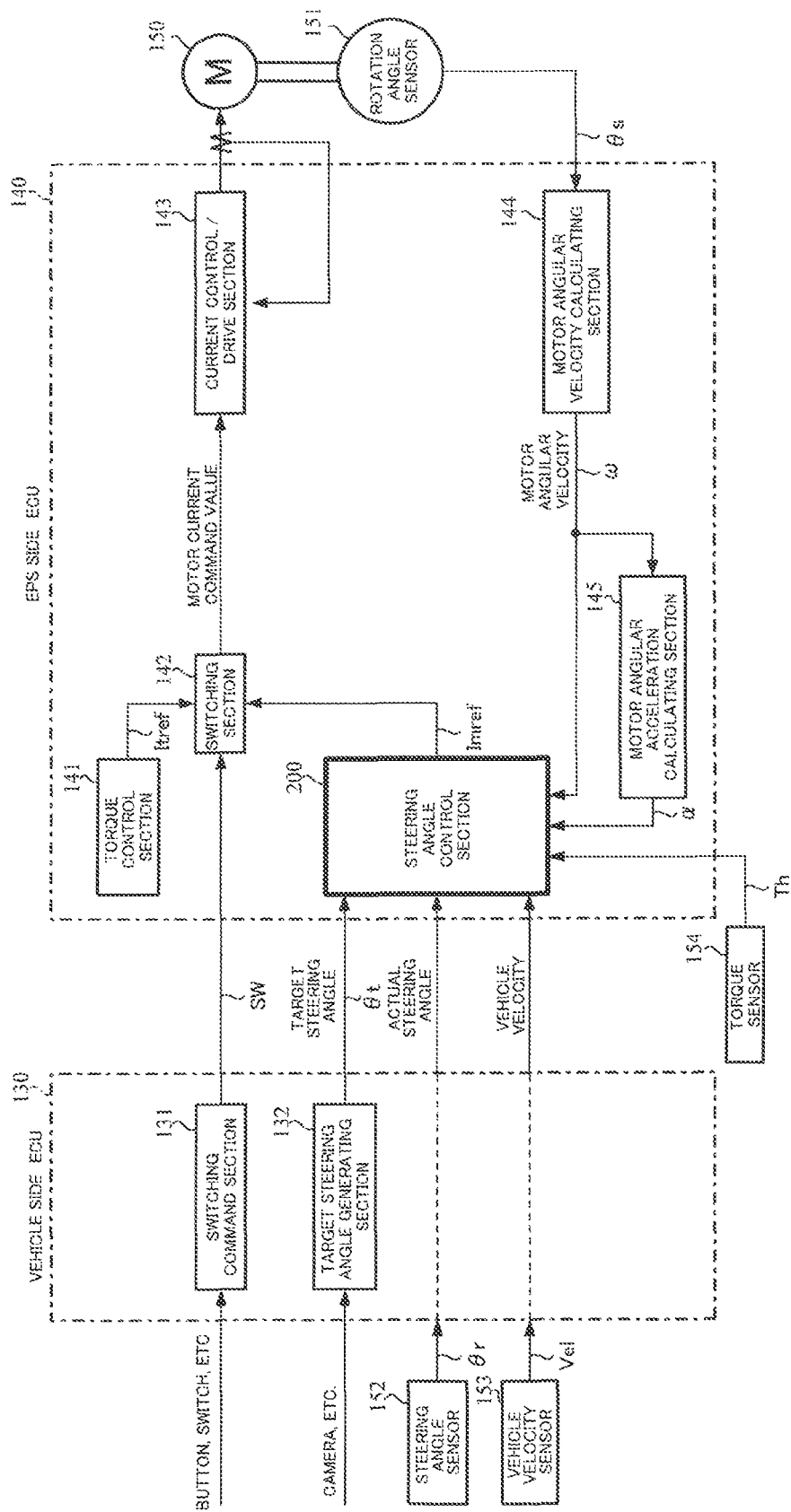
FIG. 7 is a block diagram showing a configuration example of the present invention.

FIG. 7 is a block diagram showing a configuration example of the present invention. As shown in FIG. 7, a rotation angle sensor 151 for detecting a motor rotation angle θs such as a resolver is connected to a motor 150, and the motor 150 is drive-controlled via a vehicle side ECU 130 and an EPS (Electric Power Steering apparatus) side ECU 140.

The vehicle side ECU 130 comprises a switching command section 131 that outputs a switching command SW of the automatic steering mode or the manual steering mode based on a button, a switch or the like indicating the intention of a driver and a target steering angle generating section 132 that generates a target steering angle θt based on a signal from a camera (image), a distance sensor or the like. Further, an actual steering angle θr detected by a steering angle sensor 152 provided on the column shaft and a vehicle velocity Vel from a vehicle velocity sensor 153, are inputted into a steering angle control section 200 within the EPS side ECU 140 through the vehicle side ECU 130. The steering angle sensor 152 may be a steering angle estimation value based on the column shaft (including an intermediate shaft, a pinion shaft), the displacement of rack of the rack and pinion or a wheel velocity. Further, it is also possible to receive the vehicle velocity Vel from the CAN or the like.

The switching command section 131 outputs the switching command SW based on a signal that identifies entering the automatic steering mode, for example, based on the button or the switch indicating the intention of the driver that is provided on a dashboard or on the periphery of the steering wheel, or a vehicle state signal represented by a parking mode or the like provided on the shift, and then the switching command SW is inputted into a switching section 142 within the EPS side ECU 140. Further, the target steering angle generating section 132 generates the target steering angle θt based on data from the camera (image), the distance sensor or the like by means of a publicly-known method, and inputs the generated target steering angle θt into the steering angle control section 200 within the EPS side ECU 140.

The EPS side ECU 140 comprises a torque control section 141 that outputs a motor current command value Itref calculated as previously described based on the steering torque Th and the vehicle velocity Vel, the steering angle control section 200 that calculates a motor current command value Imref for the steering angle automatic control based on the target steering angle θt, the actual steering angle θr, the vehicle velocity Vel, the steering torque Th from a torque sensor 154, the motor angular velocity ω and a motor angular acceleration α and outputs the calculated motor current command value Imref, the switching section 142 that switches between the motor current command values Itref and Imref depending on the switching command SW, a current control/drive section 143 that drive-controls the motor 150 based on the motor current command value (Itref or Imref) from the switching section 142, a motor angular velocity calculating section 144 that calculates the motor angular velocity ω based on the motor rotation angle θs from the rotation angle sensor 151 and a motor angular acceleration calculating section 145 that calculates the motor angular acceleration α based on the motor angular velocity ω. The switching section 142 switches between a torque control mode (the manual steering mode) by the torque control section 141 and the automatic steering mode by the steering angle control section 200 based on the switching command SW from the switching command section 131 within the vehicle side ECU 130, in the torque control mode, outputs the motor current command value Itref, and in the automatic steering mode, outputs the motor current command value Imref. Further, the current control/drive section 143 comprises a PI current control section, a PWM control section, an inverter and so on.

Figure 8:
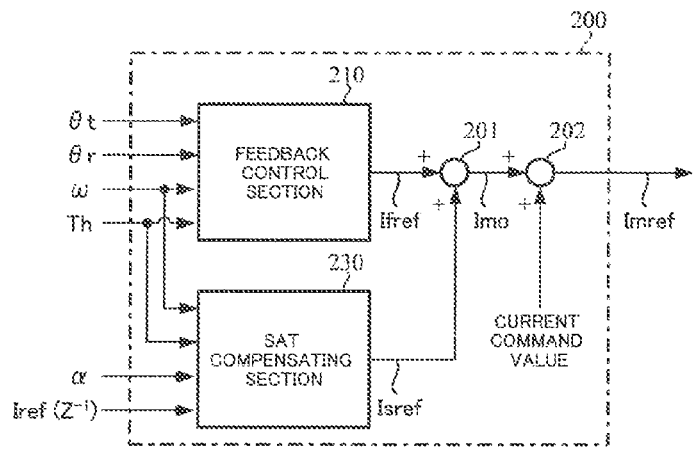
FIG. 8 is a block diagram showing a configuration example of a steering angle control section.

The steering angle control section 200 has a configuration shown in FIG. 8. As shown in FIG. 8, the steering angle control section 200 comprises a feedback control section 210 that inputs the target steering angle θt, the actual steering angle θr, the motor angular velocity ω and the steering torque Th and calculates a feedback control current command value Ifref to output, an SAT compensating section 230 that inputs the motor angular velocity co, the steering torque Th, the motor angular acceleration α and a previous time current command value Iref ($Z^{-1}$) and calculates an SAT compensation current command value Isref to output, an addition section 201 that adds the SAT compensation current command value Isref to the feedback control current command value Ifref and outputs a motor current command value Imo, and an addition section 202 that adds a current command value to the motor current command value Imo and outputs a motor current command value Imref.

The feedback control section 210 has a function that suppresses a torsional vibration caused by a torsion bar and a steering inertia. Further, an output section is comprised of the addition section 201 and the addition section 202.

Figure 9:
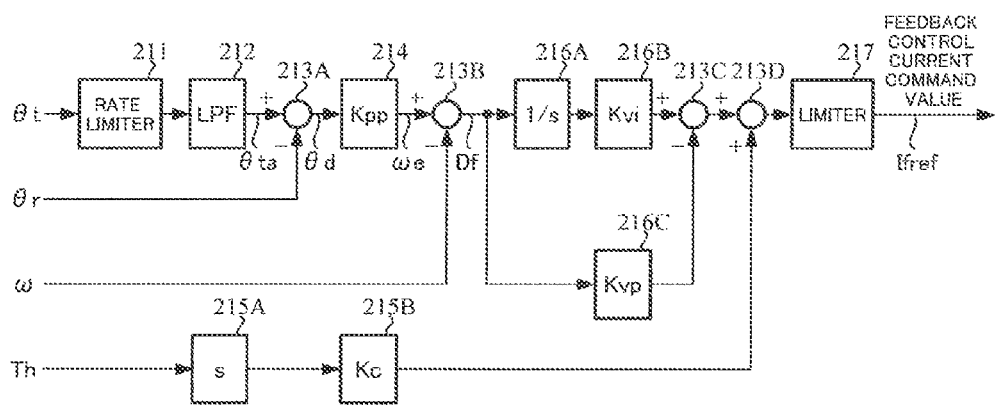
FIG. 9 is a block diagram showing a configuration example of a feedback control section.

The feedback control section 210 has a configuration shown in FIG. 9 and is a position control system that sets a velocity control loop system as a minor loop. As shown in FIG. 9, the target steering angle θt is inputted into a rate limiter 211 that performs a smoothing when the target steering angle θt changes rapidly, that is, makes the target steering angle θt change smoothly within the range of a predetermined time change rate, and a target steering angle θta passed through an LPF 212 for removing high-frequency disturbances is addition-inputted into a subtraction section 213A. The actual steering angle θr is subtraction-inputted into the subtraction section 213A, an angle deviation between the actual steering angle θr and the smoothed target steering angle θta, is multiplied by a gain Kpp in a proportional gain (Kpp) section 214 and then addition-inputted into a subtraction section 213B as an error velocity ωe. The motor angular velocity ω from the motor angular velocity calculating section 144 is subtraction-inputted into the subtraction section 213B, the calculated velocity deviation Df is multiplied by gain Kvi in an integral gain (Kvi) section 216B via an integral section 216A and then addition-inputted into a subtraction section 213C, simultaneously, the velocity deviation Df is multiplied by gain Kvp in a proportional gain (Kvp) section 216C and then subtraction-inputted into the subtraction section 213C. The subtraction result of the subtraction section 213C is inputted into an addition section 213D.

The steering torque Th from the torque sensor 154 is multiplied by a gain Kc in a differential gain (Kc) section 215B via a differential section 215A and then inputted into an addition section 213D, the addition result of the addition section 213D is limited by an upper and a lower limit values in a limiter 217 and outputted as the feedback control current command value Ifref. An output section is comprised of the subtraction section 213C, the addition section 213D and the limiter 217.

Figure 10:
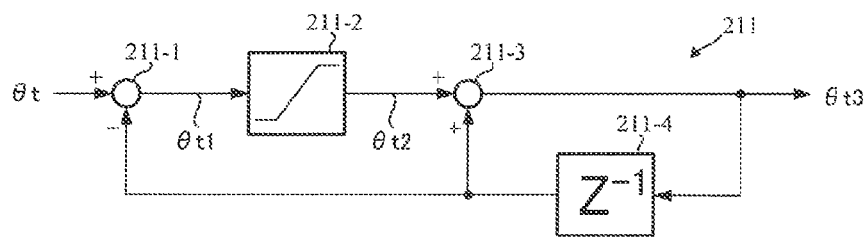
FIG. 10 is a block diagram showing a configuration example of a rate limiter.
Figure 11:
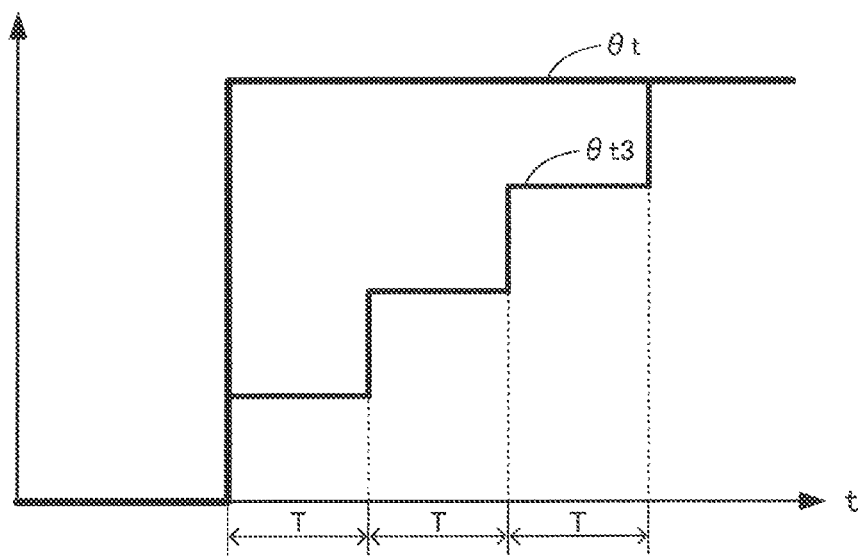
FIG. 11 is a block diagram showing a configuration example of a variation amount setting section.

The rate limiter 211 performs a smoothing with respect to the target steering angle θt and outputs the smoothed target steering angle θt when the target steering angle θt changes rapidly, for example, has a configuration shown in FIG. 10. As shown in FIG. 10, the target steering angle θt is addition-inputted into a subtraction section 211-1, depending on a steering angle θt1 being the subtraction result obtained by subtracting a past value from the target steering angle θt, a variation-amount setting section 211-2 sets a variation amount θt2. The variation-amount setting section 211-2 sets a difference θt1 between the past value from a holding section ($Z^{-1}$) 211-4 and the input (θt), and the addition result obtained by adding the past value to the variation-amount θt2 in an addition section 211-3 is outputted as a new target steering angle θt3. The variation-amount setting section 211-2 makes the variation-amount not exceeding an upper limit and a lower limit that are set, that characteristic obtains the difference with the input (target steering angle) et at each of calculation periods, in the case of falling outside the upper limit and the lower limit of the variation-amount setting section 211-2, by repeatedly performing adding the difference to the past value, the output θt3 varies in a staircase pattern shown in FIG. 11 and finally matching the output θt3 with the target steering angle θt. Further, in the case that the difference with the input (target steering angle) et is within the range of the upper limit and the lower limit of the variation-amount setting section 211-2, since the variation-amount θt2 (=the difference θt1) is outputted and added to the past value, the result output θt3 coincides with the input (target steering angle) et. As these results, even if the target steering angle θt changes rapidly, it is possible to smoothly vary the target steering angle θt changing rapidly, a sudden current variation (i.e. a steering at a high speed) is prevented, a function that reduces an anxious feeling relating to the automatic operation of the driver is fulfilled.

The SAT compensating section 230 obtains an SAT torque (column shaft conversion) from a motion equation around the column shaft and obtains an SAT estimation current value $I_{SAT}$ being a motor current that corresponds to the SAT torque. Then, the SAT estimation current value $I_{SAT}$ is passed through the LPF that the cut-off frequency higher than the angle response frequency is set, further multiplied by a vehicle velocity sensitive gain set by the vehicle velocity, and obtains the SAT compensation current command value Isref.

In obtaining the SAT torque (column shaft conversion) from the motion equation around the column shaft and obtaining the SAT estimation current value $I_{SAT}$ corresponding to the SAT torque, the following Expression 3 is used.

$$I_c \dot{\omega}_c = T_{sat} + K_t i + T_h - c\omega_c - T_{Frc} \cdot \text{sign}(\omega_c) \quad \text{[Expression 3]}$$

$$T_{sat} = I_c \dot{\omega}_c - K_t i - T_h + c\omega_c + T_{Frc} \cdot \text{sign}(\omega_c)$$

$$I_{sat} = \frac{T_{sat}}{K_t} = -i + \frac{1}{K_t}(-T_h + I_c \dot{\omega}_c + c\omega_c + T_{Frc} \cdot \text{sign}(\omega_c))$$

Where Ic is an overall inertial moment of a column converted to the column shaft, the rack and pinion mechanism and the tires, $\omega_c$ is a column shaft angular velocity, Th is the steering torque (a torsion torque of a torsion bar), $T_{Frc}$ is a Coulomb friction acting on the column shaft, c is a column shaft viscous friction coefficient, and Kt is a coefficient (a motor torque constant×a reduction ratio) that converts from the current value to the torque of the column shaft.

Figure 12:
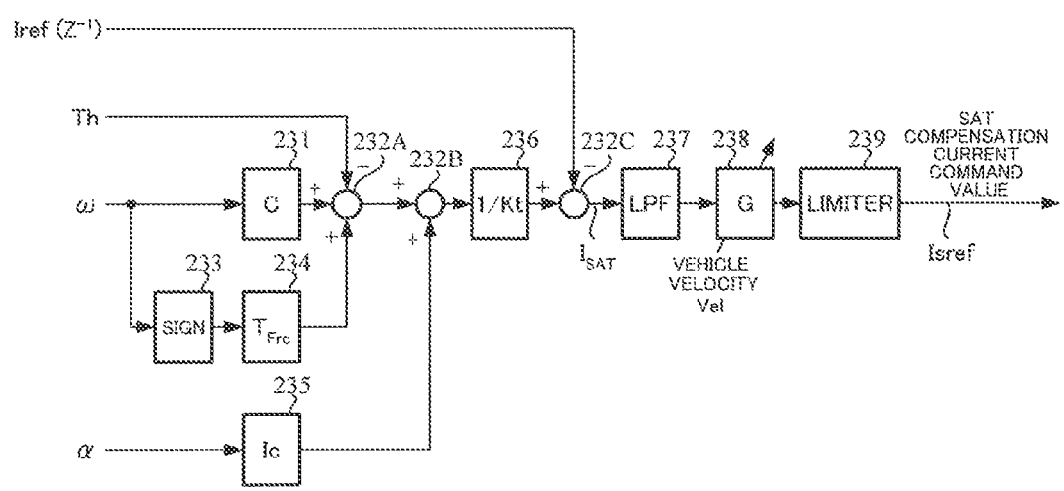
FIG. 12 is a block diagram showing one configuration example of an SAT compensating section.

The SAT compensating section 230 based on the above Expression 3 has a configuration shown in FIG. 12. As shown in FIG. 12, the motor angular velocity ω is inputted into a viscous friction coefficient (c) section 231, multiplied by the viscous friction coefficient c and addition-inputted into an addition and subtraction section 232A, simultaneously, is signized by a sign section 233, multiplied by the Coulomb friction $I_{Frc}$ in a Coulomb friction ($T_{Frc}$) section 234 and addition-inputted into the addition and subtraction section 232A. A signization Coulomb friction section is comprised of the sign section 233 and the Coulomb friction section 234. Further, the steering torque Th is subtraction-inputted into the addition and subtraction section 232A, and the addition and subtraction result is addition-inputted into an addition section 232B. The motor angular acceleration α (here, the motor angular acceleration α is considered as being equal to a column shaft angular acceleration) is inputted into an overall inertial moment (Ic) section 235, multiplied by the overall inertial moment Ic and inputted into the addition section 232B. The addition result obtained in the addition section 232B is inputted into a coefficient (1/Kt) section 236, multiplied by 1/Kt and addition-inputted into a subtraction section 232C. The previous time current command value Iref($Z^{-1}$) is subtraction-inputted into the subtraction section 232C, and the difference is outputted as the SAT estimation current value $I_{SAT}$ that generates the motor torque corresponding to the SAT. An output coefficient section is comprised of the addition section 232B, the coefficient section 236 and the subtraction section 232C.

Figure 13:
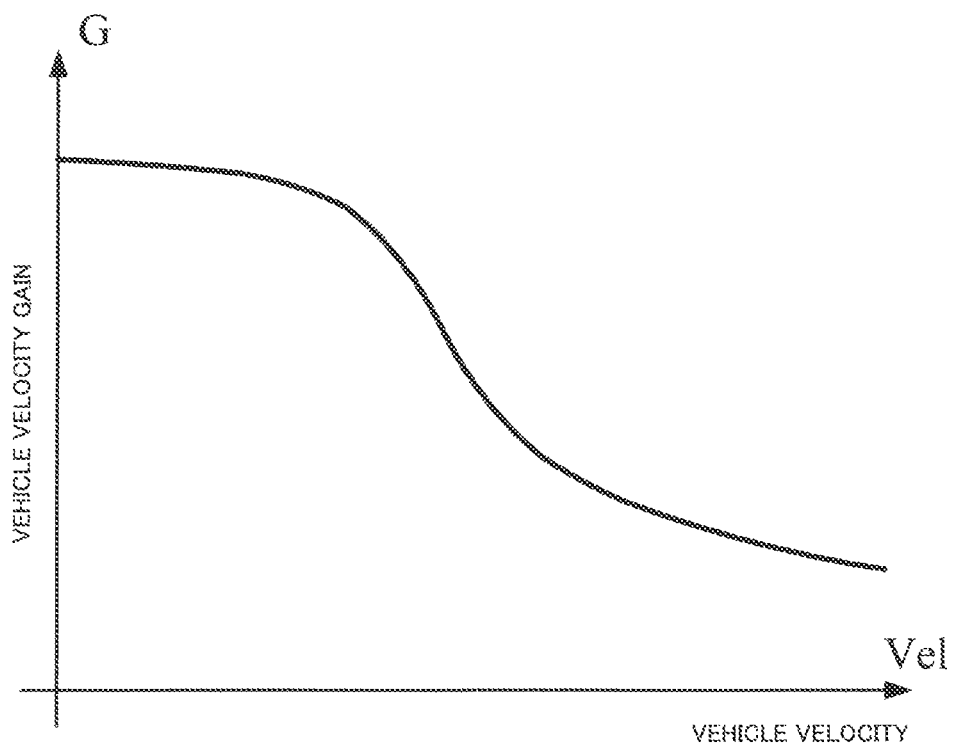
FIG. 13 is a characteristic diagram showing a characteristic example of a vehicle velocity sensitive gain section.

When adding the SAT estimation current value $I_{SAT}$ to the current command value without any change, since vibrations and noises are easy to occur, filtering of the SAT estimation current value $I_{SAT}$ is performed by an LPF 237 having a characteristic that the cut-off frequency is higher than a response frequency (for example, 1 Hz) of the steering angle control. An output of the filtering of the LPF 237 is multiplied by a gain G in a gain (G) section 238. The current command value multiplied by the gain G is limited by an upper and a lower limit values in a limiter 239, and the SAT compensation current command value Isref is outputted from the limiter 239. The limiter 239 is not always required. The gain section 238 may be sensitive to the vehicle velocity, and a gain G characteristic of a vehicle velocity sensitive gain may be a characteristic that for example, as shown in FIG. 13, the gain G gradually becomes small according to an increase in the vehicle velocity Vel.

Figure 14:
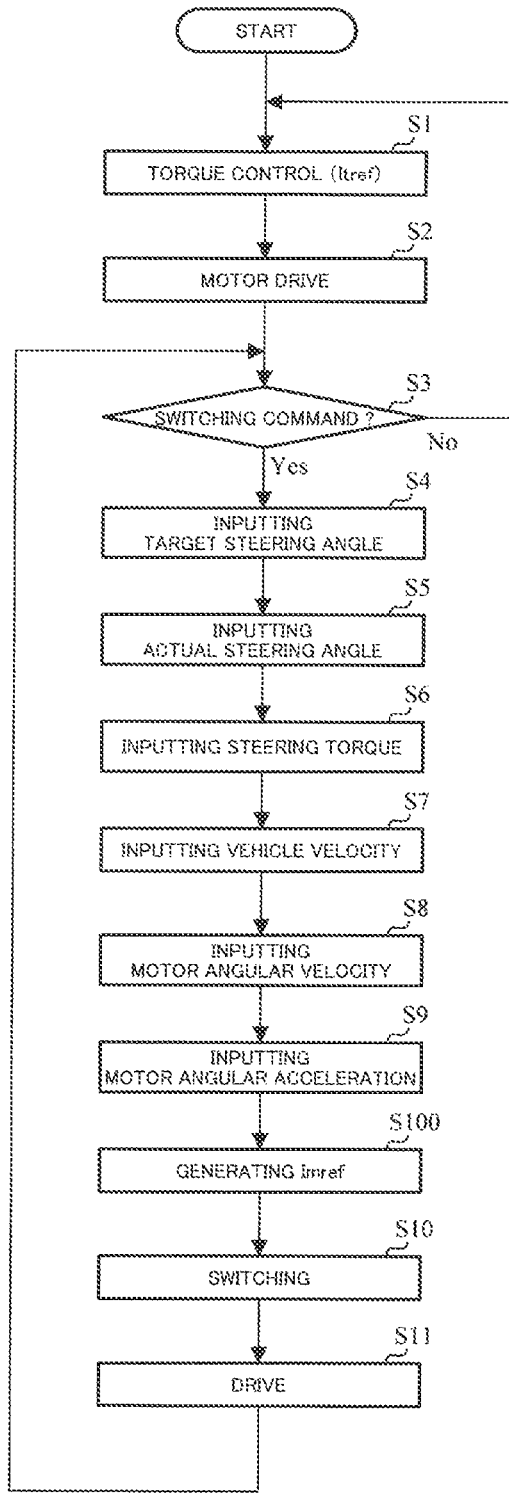
FIG. 14 is a flowchart showing an operation example of the present invention.

In such a configuration, an entire operation example of the present invention will be described with reference to a flowchart shown in FIG. 14.

When the operation of the steering system starts, the torque control by the torque control section 141 is carried out (Step S1), and the motor 150 is driven by using the motor current command value Itref and by means of the current control/drive section 143 (Step S2). The above operations are repeatedly performed until the switching command SW is outputted from the switching command section 131 (Step S3).

When becoming the automatic steering mode and the switching command SW is outputted from the switching command section 131, the target steering angle θt is inputted from the target steering angle generating section 132 (Step S4), the actual steering angle θr is inputted from the steering angle sensor 152 (Step S5), the steering torque Th is inputted from the torque sensor 154 (Step S6), the vehicle velocity Vel is inputted from the vehicle velocity sensor 153 (Step S7), the motor angular velocity ω is inputted from the motor angular velocity calculating section 144 (Step S8), further the motor angular acceleration α is inputted from the motor angular acceleration calculating section 145 (Step S9), and then the motor current command value Imref is generated by the steering angle control section 200 (Step S100). Moreover, the target steering angle θt, the actual steering angle θr, the steering torque Th, the motor angular velocity ω and the motor angular acceleration α can be inputted in an arbitrary order.

Then, the switching section 142 is switched by the switching command SW from the switching command section 131 (Step S10), the motor 150 is driven by using the motor current command value Imref from the steering angle control section 200 and by means of the current control/drive section 143 (Step S11), and a return to the above Step S3 is made. The drive control based on the motor current command value Imref is repeatedly performed until the switching command SW is changed from the switching command section 131.

Figure 15:
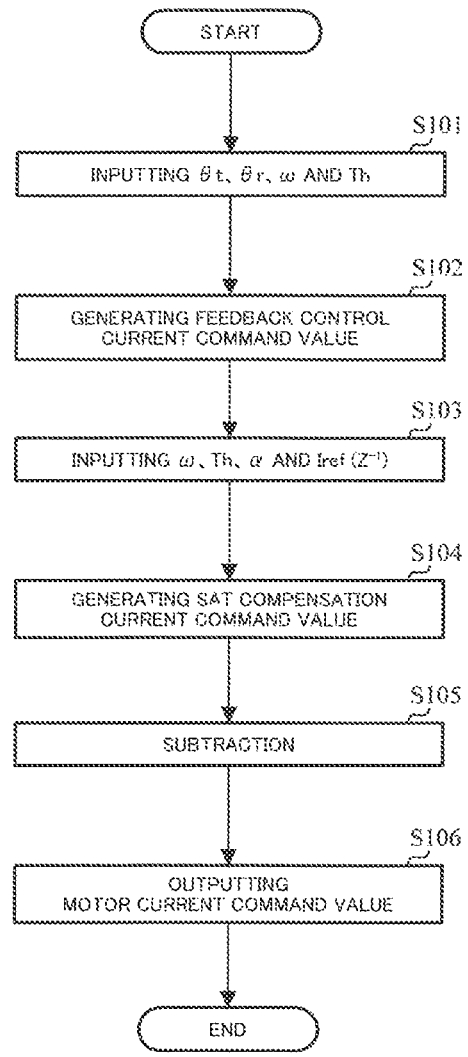
FIG. 15 is a flowchart showing an operation example of the steering angle control section.

The generation of the motor current command value Imref is performed by the steering angle control section 200, and a flowchart of FIG. 15 shows the generating operation of the motor current command value Imref performed in the steering angle control section 200.

Firstly, the feedback control section 210 inputs the target steering angle θt, the actual steering angle θr, the motor angular velocity ω and the steering torque Th (Step S101), and generates the feedback control current command value Ifref (Step S102). Concurrently, the SAT compensating section 230 inputs the motor angular velocity ω, the steering torque Th, the motor angular acceleration α and the previous time current command value Iref ($Z^{-1}$) (Step S103), and generates the SAT compensation current command value Isref (Step S104). The feedback control current command value Ifref is inputted into the addition section 201, and simultaneously the SAT compensation current command value Isref is inputted into the addition section 201 (Step S105). The addition section 202 adds the current command value to the current command value Imo (=Ifref−Imref) being the addition result obtained in the addition section 201 and outputs the motor current command value Imref.

Figure 16:
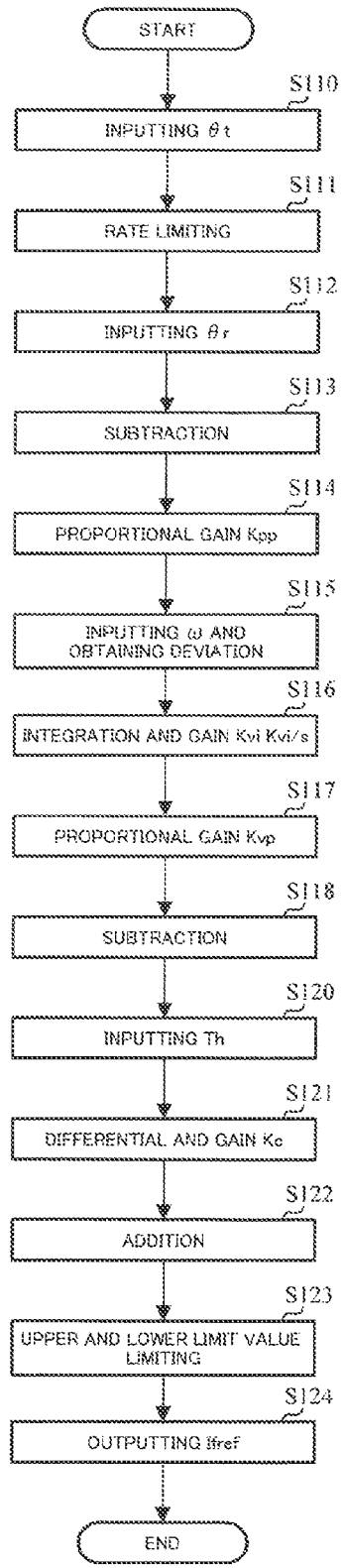
FIG. 16 is a flowchart showing an operation example of the feedback control section.

Next, operations of the feedback control section 210 will be described with reference to a flowchart shown in FIG. 16.

The target steering angle θt is inputted into the rate limiter 211 (Step S110), the rate limiting operation described as above is performed in the rate limiter 211 (Step S111), and the target steering angle θta that passed through the LPF 212 is inputted into the subtraction section 213A. Further, the actual steering angle θr is inputted from the steering angle sensor 152 (Step S112), the subtraction of "θta−θr" is performed in the subtraction section 213A (Step S113), the angle deviation θd being the subtraction result obtained in the subtraction section 213A is multiplied by the gain Kpp in the proportional gain section 214 and addition-inputted into the subtraction section 213B (Step S114). The motor angular velocity ω is subtraction-inputted into the subtraction section 213B, and the velocity deviation between the motor angular velocity ω and the angular velocity multiplied by the gain Kpp is obtained (Step S115). The velocity deviation obtained in the subtraction section 213B is integrated by the integral section 216A, multiplied by the gain Kvi in the integral gain section 216B and addition-inputted into the subtraction section 213C (Step S116), simultaneously, is multiplied by the proportional gain Kvp in the proportional gain section 216C, subtraction-inputted into the subtraction section 213C (Step S117) and subtracted in the subtraction section 213C (Step S118).

Thereafter, the steering torque Th is inputted (Step S120), the steering torque Th is differentiated by the differential section 215A, multiplied by the differential gain Kc in the differential gain section 215B and inputted into the addition section 213D (Step S121). An output of the differential gain section 215B that is inputted into the addition section 213D, is added to the subtraction result obtained in the subtraction section 213C by means of the addition section 213D (Step S122), limited by the upper and the lower limit values in the limiter 217 (Step S123), and outputted as the feedback control current command value Ifref (Step S124).

Figure 17:
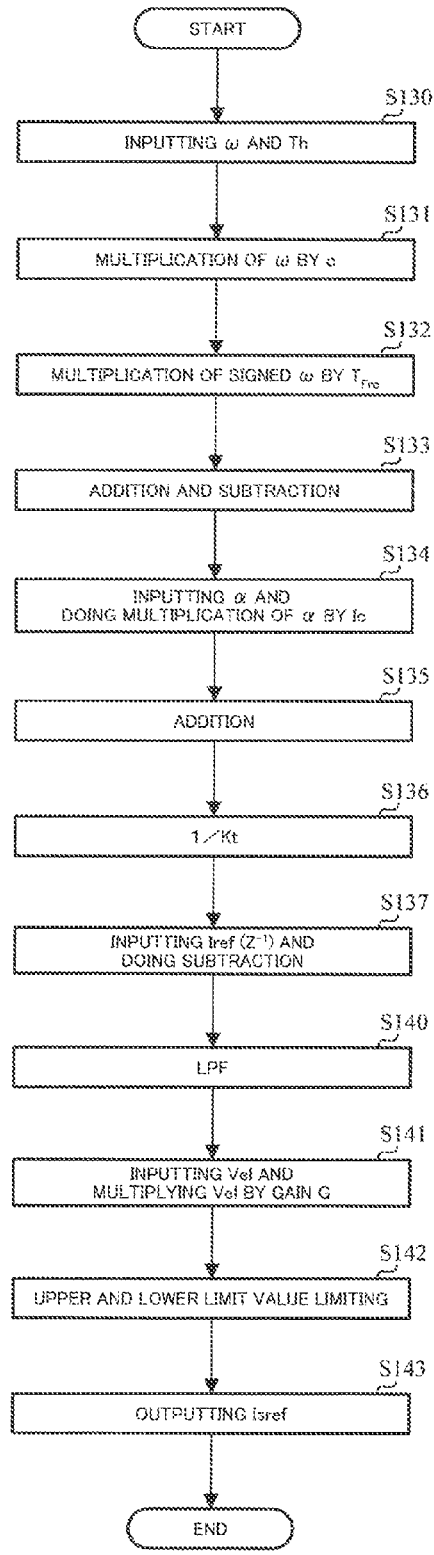
FIG. 17 is a flowchart showing an operation example of the SAT compensating section.

Next, operations of the SAT compensating section 230 will be described with reference to a flowchart shown in FIG. 17.

The motor angular velocity ω and the steering torque Th are inputted (Step S130), the motor angular velocity ω is multiplied by the viscous friction coefficient c in the viscous friction coefficient section 231 (Step S131), the motor angular velocity co is signized by the sign section 233 and multiplied by the Coulomb friction $I_{Frc}$ in the Coulomb friction section 234 (Step S132), an output of the viscous friction coefficient section 231 and an output of the Coulomb friction section 234 are added, and simultaneously, the addition and subtraction section 232A performs addition and subtraction of the steering torque Th (Step S133).

Next, the motor angular acceleration α is inputted into the overall inertial moment section 235, multiplied by the overall inertial moment Ic (Step S134), and added in the addition section 232B (Step S135). The addition result obtained in the addition section 232B is multiplied by 1/Kt in the coefficient section 236 and addition-inputted into the subtraction section 232C, and the subtraction section 232C subtracts the previous time current command value Iref ($Z^{-1}$) that is separately inputted (stored) from an output of the coefficient section 236 that is inputted into the subtraction section 232C (Step S137). The subtraction result of the subtraction section 232C is outputted as the SAT estimation current value $I_{SAT}$ that generates the motor torque corresponding to the SAT, and the filtering of the SAT estimation current value $I_{SAT}$ is performed by the LPF 237 (Step S140), the vehicle velocity Vel is inputted into the gain section 238 and multiplied by the gain G (Step S141), further limited by the upper and the lower limit values in the limiter 239 (Step S122), and the SAT compensation current command value Isref is outputted from the limiter 239 (step S143).

Figure 1:
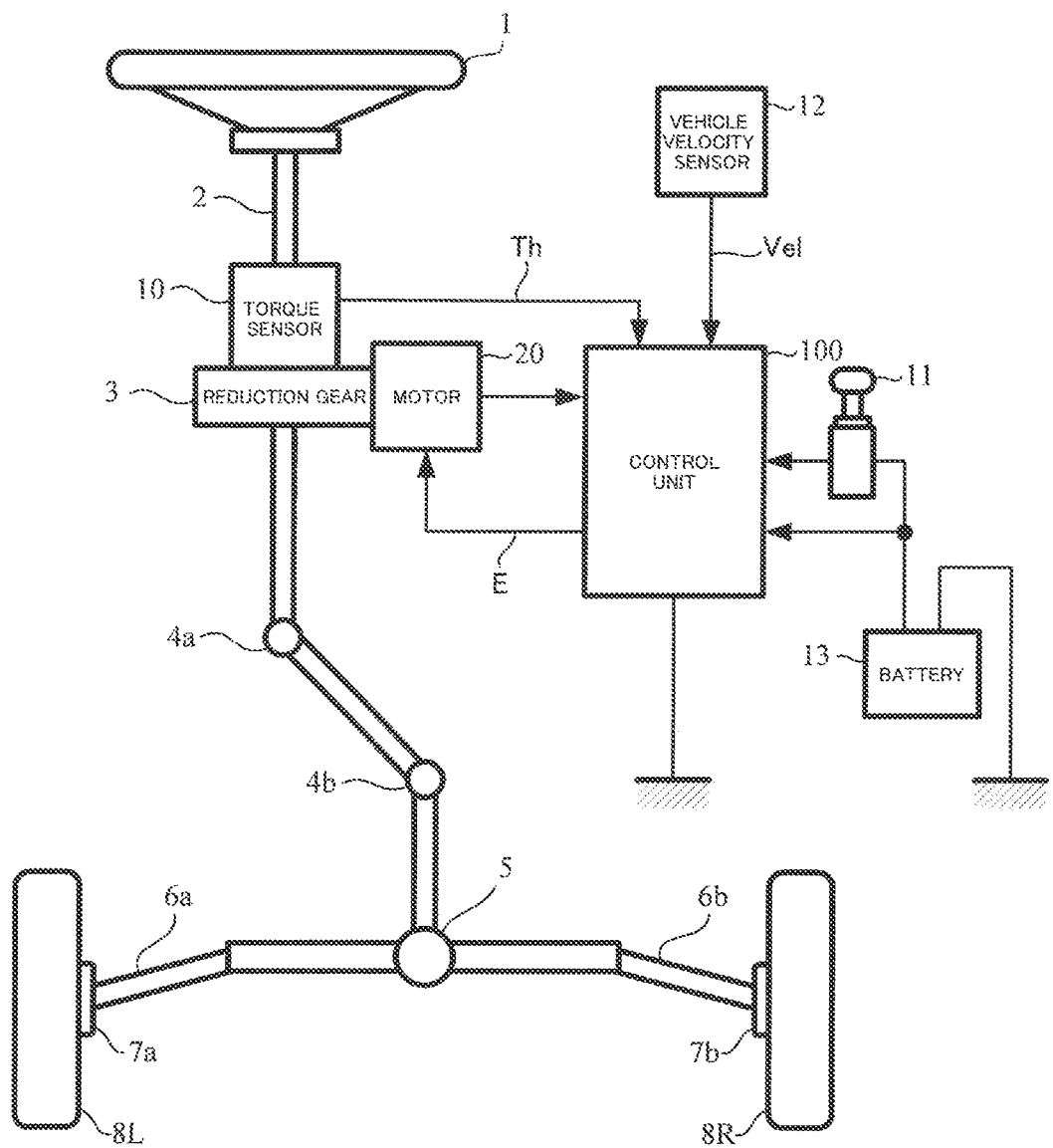
FIG. 1 depicts PRIOR ART is a configuration diagram illustrating a general outline of an electric power steering apparatus.
Figure 2:
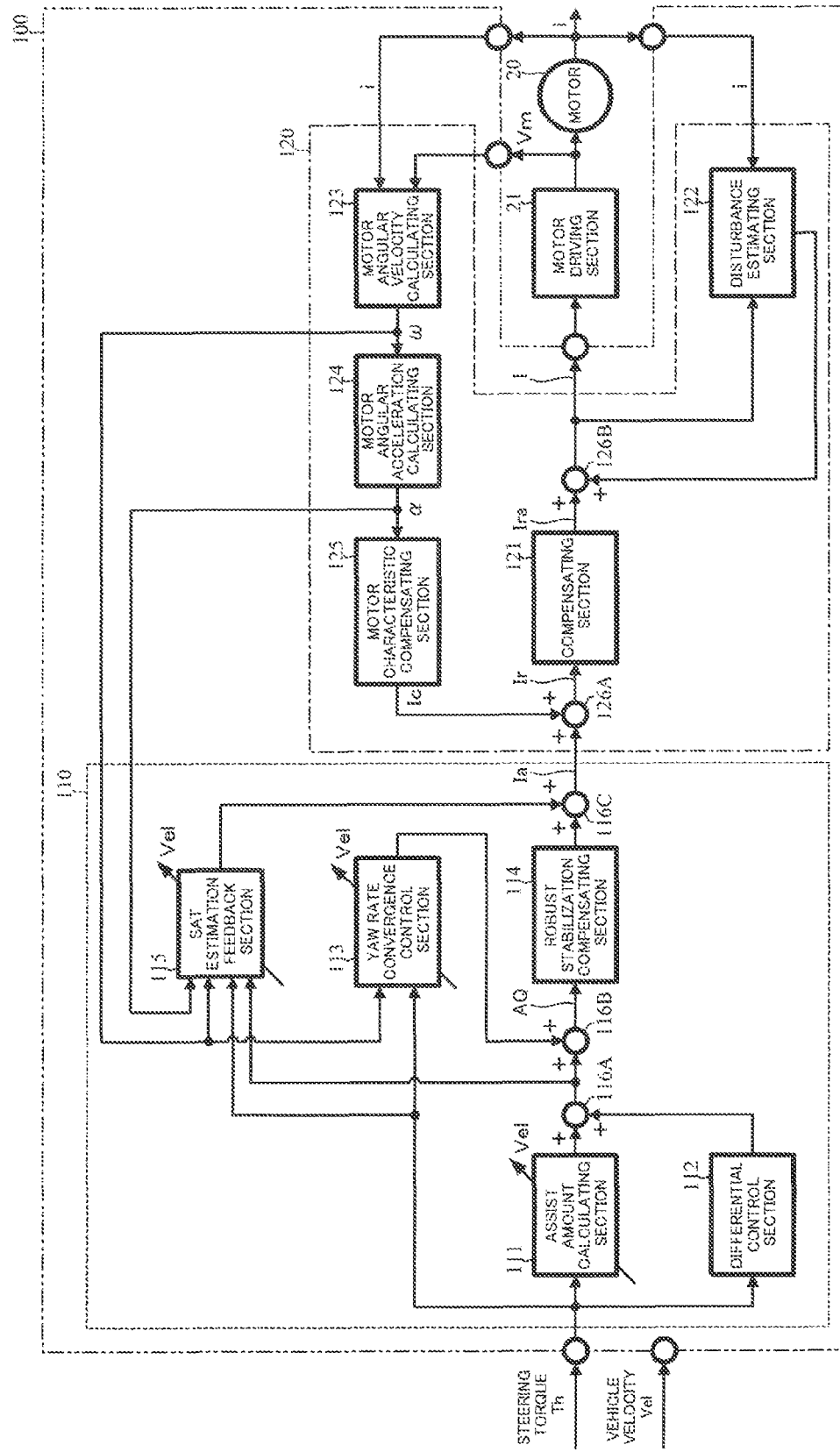
FIG. 2 is a block diagram showing a configuration example of a control system of the electric power steering apparatus.
Figure 3:
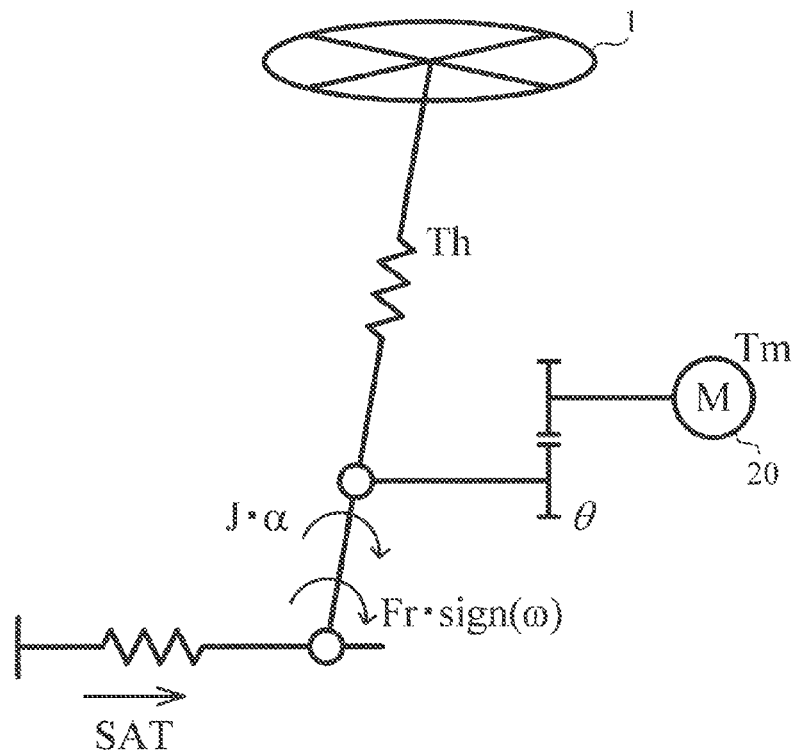
FIG. 3 is a conceptual diagram illustrating aspects of torques generated between a road surface and a steering system.
Figure 4:
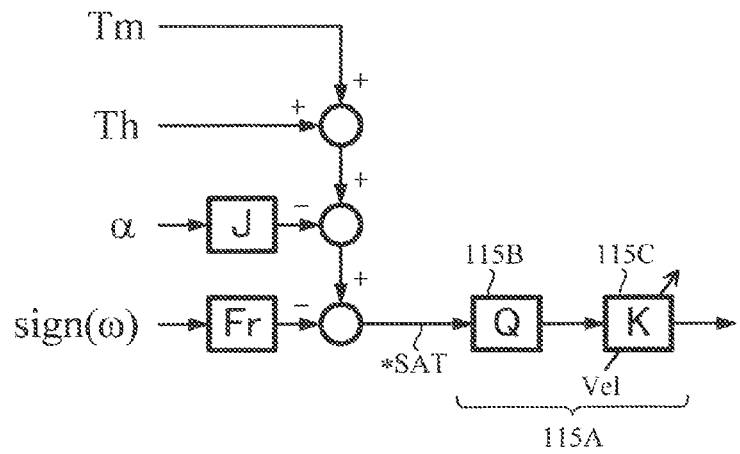
FIG. 4 is a block diagram showing a configuration example of a feedback section.
Figure 5:
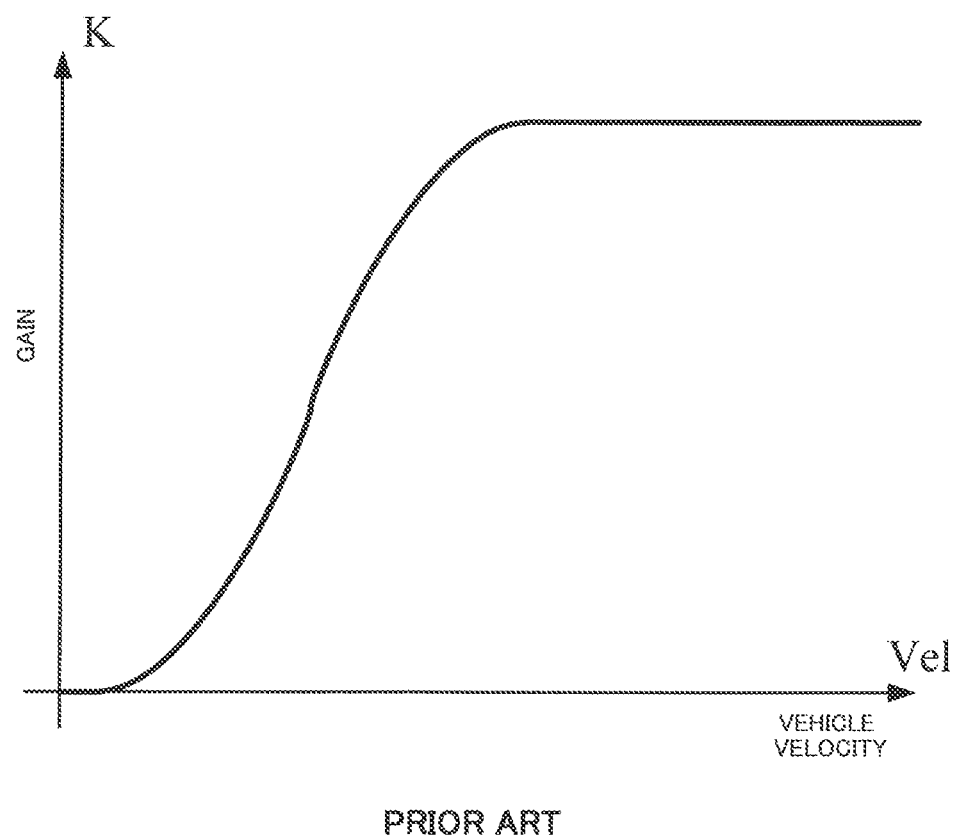
FIG. 5 is a diagram showing a characteristic example of a feedback filter.
Figure 18:
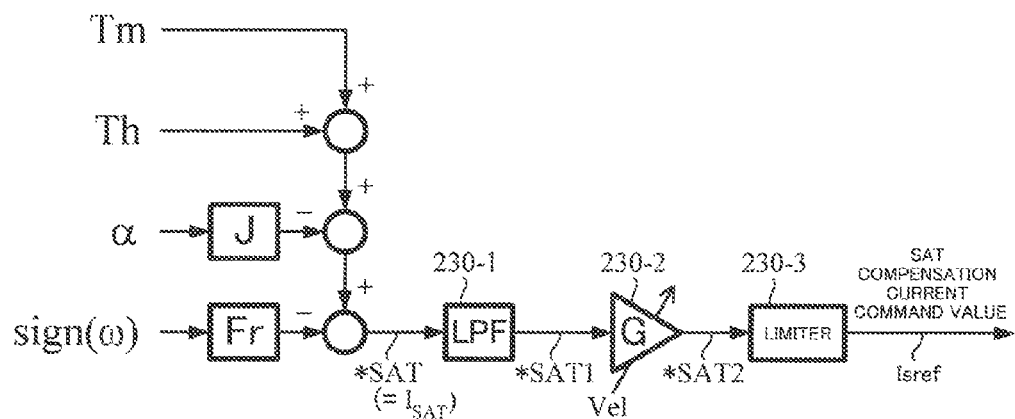
FIG. 18 is a block diagram showing another configuration example of the SAT compensating section.

Although the SAT compensating section 230 shown in FIG. 12 is configured based on the above Expression 3, also with respect to the SAT estimation described in FIG. 4, it is possible to configure in the same way. FIG. 18 shows that configuration example and it is possible to obtain the SAT compensation current command value Isref by using of the SAT estimation current value *SAT (=$I_{SAT}$), an LPF 230-1 having a characteristic the same as described above, a vehicle velocity sensitive type gain (G) section 230-2 and a limiter 230-3.

EXPLANATION OF REFERENCE NUMERALS 1 steering wheel
2 column shaft (steering shaft)
10,154 torque sensor
12,153 vehicle velocity sensor
13 battery
20,150 motor
21 motor driving section
100 control unit (ECU)
110 torque system control unit
120 motor system control unit
151 rotation angle sensor
152 steering angle sensor
130 vehicle side ECU
131 switching command section
132 target steering angle generating section
140 EPS side ECU
141 torque control section
142 switching section
143 current control/drive section
144 motor angular velocity calculating section
145 motor angular acceleration calculating section
200 steering angle control section
210 feedback control section
211 rate limiter
211-2 variation amount setting section
211-4 holding section
212,230-1,237 LPF (low pass filter)
214 proportional gain section
215A differential section
215B differential gain (Kc) section
216A integral section
216B integral gain (Kvi) section
216C proportional gain (Kvp) section
217,239,230-3 limiter
230 SAT compensating section
231 viscous friction coefficient section
233 sign section
234 Coulomb friction section
238 (vehicle velocity sensitive) gain section

The invention claimed is:

1. An electric power steering apparatus that calculates a first motor current command value based on a steering torque and a vehicle velocity, performs an assist control of a steering system by driving a motor based on said first motor current command value, and has a function for switching between an automatic steering mode and a manual steering mode, comprising:
 a steering angle control section that calculates a second motor current command value based on a target steering angle, an actual steering angle, a motor angular velocity and a motor angular acceleration of said motor, said steering torque and a previous time current command value; and
 a switching section that inputs said first motor current command value and said second motor current command value to switch,
 wherein said steering angle control section comprises
  a feedback control section that generates a feedback control current command value based on said target steering angle, said actual steering angle, said motor angular velocity and said steering angle;
 a steering assist torque SAT compensating section that generates an SAT compensation current command value based on said motor angular velocity, said motor angular acceleration, said steering torque and said previous time current command value; and
 an output section that generates said second motor current command value from said feedback control current command value and said SAT compensation current command value,
 wherein said feedback control section comprises
  a rate limiter that performs a smoothing with respect to said target steering angle;
  a low pass filter (LPF) that is connected to an output of said rate limiter;
  a first proportional gain section that multiplies an angle deviation between an output of said LPF and said actual steering angle by a proportional gain;
  an integral gain section that integrates a velocity deviation between an error velocity from said first proportional gain section and said motor angular velocity and multiplies said integrated velocity deviation by an integral gain;
  a second proportional gain section that multiplies said velocity deviation by a proportional gain;
  a differential gain section that differentiates said steering torque and multiplies said differentiated steering torque by a differential gain; and
  an output section that performs an addition that adds an output of said differential gain section to a deviation value between an output of said integral gain section and an output of said second proportional gain section, limits a result of said addition by an upper and a lower limit values and outputs said feedback control current command value, wherein said switching section is switched depending on a switching command of said automatic steering mode and said manual steering mode, said motor is drive-controlled based on said second motor current command value in said automatic steering mode.

2. The electric power steering apparatus according to claim 1, wherein said SAT compensating section comprises an SAT estimating section that calculates an SAT estimation current value based on said steering torque, said motor angular velocity, said motor angular acceleration and said previous time current command value;

a low pass filter (LPF) that inputs said SAT estimation current value and simultaneously has a characteristic that a cut-off frequency is higher than an angle response frequency; and a vehicle velocity sensitive gain section that multiplies an output of said LPF by a vehicle velocity variable gain and outputs said SAT compensation current command value.

3. The electric power steering apparatus according to claim 2, wherein said SAT estimating section comprises a viscous friction coefficient section that multiplies said motor angular velocity by a viscous friction coefficient;

a signization Coulomb friction section that signizes said motor angular velocity and multiplies said signized motor angular velocity by a Coulomb friction;

an overall inertial moment section that multiplies said motor angular acceleration by an overall inertial moment; and an output coefficient section that performs a subtraction that subtracts said steering torque from an addition value of an output of said viscous friction coefficient section and an output of said signization Coulomb friction section, performs an addition that adds an output of said overall inertial moment section to a result of said subtraction, and multiplies a result of said addition by a coefficient.

4. The electric power steering apparatus according to claim 3, wherein a limiter that limits an upper and a lower limit values is connected to a post-stage of said vehicle velocity sensitive gain section.

5. The electric power steering apparatus according to claim 2, wherein a limiter that limits an upper and a lower limit values is connected to a post-stage of said vehicle velocity sensitive gain section.

6. The electric power steering apparatus according to claim 2, wherein said SAT estimating section comprises an addition section that adds a current command value corresponding to an assist torque and said steering torque;

a first subtraction section that subtracts a value obtained by multiplying said motor angular acceleration by an inertial from an addition result of said addition section; and a second subtraction section that subtracts a value obtained by signizing said motor angular velocity and multiplying said signized motor angular velocity by a friction from a subtraction result of said first subtraction section, and outputs said SAT estimation current value.

7. The electric power steering apparatus according to claim 6, wherein a limiter that limits an upper and a lower limit values is connected to a post-stage of said vehicle velocity sensitive gain section.

8. An electric power steering apparatus that calculates a first motor current command value based on a steering torque and a vehicle velocity, performs an assist control of a steering system by driving a motor based on said first motor current command value, and has a function for switching between an automatic steering mode and a manual steering mode, comprising:

a steering angle control section that calculates a second motor current command value based on a target steering angle, an actual steering angle, a motor angular velocity and a motor angular acceleration of said motor, said steering torque and a previous time current command value; and a switching section that inputs said first motor current command value and said second motor current command value to switch, wherein said steering angle control section comprises a feedback control section that generates a feedback control current command value based on said target steering angle, said actual steering angle, said motor angular velocity and said steering angle;

an SAT compensating section that generates an SAT compensation current command value based on said motor angular velocity, said motor angular acceleration, said steering torque and said previous time current command value; and an output section that generates said second motor current command value from said feedback control current command value and said SAT compensation current command value, wherein said SAT compensating section comprises an SAT estimating section that calculates an SAT estimation current value based on said steering torque, said motor angular velocity, said motor angular acceleration and said previous time current command value;

a low pass filter (LPF) that inputs said SAT estimation current value and simultaneously has a characteristic that a cut-off frequency is higher than an angle response frequency; and a vehicle velocity sensitive gain section that multiplies an output of said LPF by a vehicle velocity variable gain and outputs said SAT compensation current command value, wherein said SAT estimating section comprises a viscous friction coefficient section that multiplies said motor angular velocity by a viscous friction coefficient;

a signization Coulomb friction section that signizes said motor angular velocity and multiplies said signized motor angular velocity by a Coulomb friction;

an overall inertial moment section that multiplies said motor angular acceleration by an overall inertial moment; and an output coefficient section that performs a subtraction that subtracts said steering torque from an addition value of an output of said viscous friction coefficient section and an output of said signization Coulomb friction section, performs an addition that adds an output of said overall inertial moment section to a result of said subtraction, and multiplies a result of said addition by a coefficient, wherein said switching section is switched depending on a switching command of said automatic steering mode and said manual steering mode, said motor is drive-controlled based on said second motor current command value in said automatic steering mode.

9. The electric power steering apparatus according to claim 8, wherein a limiter that limits an upper and a lower limit values is connected to a post-stage of said vehicle velocity sensitive gain section.

\* \* \* \* \*